Patented Aug. 3, 1937

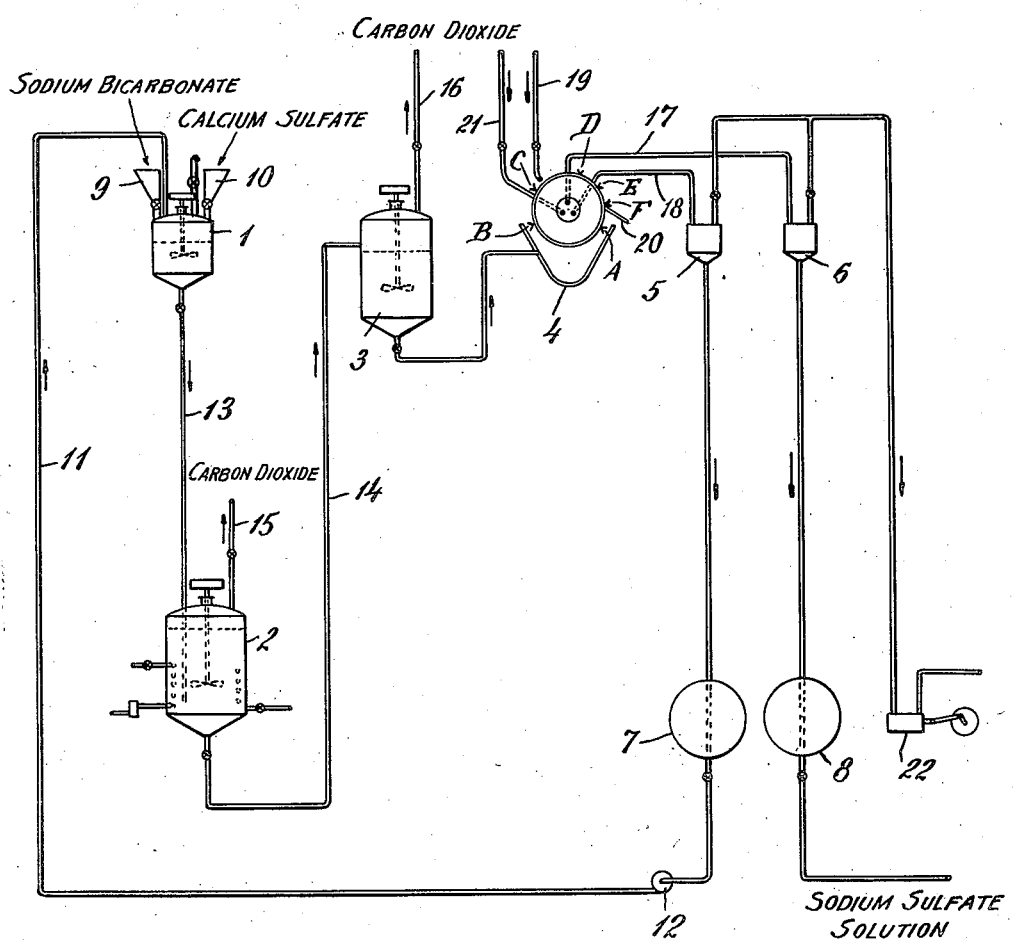

2,089,129

UNITED STATES PATENT OFFICE 2,089,129

MANUFACTURE OF SODIUM SULPHATE

Robert B. MacMullin, Niagara Falls, N. Y., assignor to The Mathieson Alkali Works, Inc., New York, N. Y., a corporation of Virginia Application January 5, 1934, Serial No. 705,332

6 Claims. (Cl. 23—121)

This invention relates to improvements in the manufacture of sodium sulphate by treatment of sodium bicarbonate with calcium sulphate. The recovery of gaseous carbon dioxide from bicarbonates including sodium bicarbonate with concurrent recovery of solutions, in the case of sodium bicarbonate, of sodium sulphate by treatment of the bicarbonate with calcium sulphate is described in an application of George L. Cuningham, filed January 9, 1934, Serial Number 705,881. This invention relates more particularly to improvements with respect to the recovery of sodium sulphate in such operations.

Economy of such operations with respect to the recovery of sodium sulphate requires that the reaction involved be carried substantially to completion, and rapidly, to maintain high recovery of concentrated, substantially saturated, solutions of sodium sulphate. This invention relates more particularly to improvements which promote these ends without disadvantage with respect to the concurrent recovery of gaseous carbon dioxide.

To permit recovery of the liberated gaseous carbon dioxide in a state of purity or under superatmospheric pressure, the reaction between calcium sulphate and sodium bicarbonate is carried out in a closed vessel. At temperatures below about 20° C. the reaction proceeds relatively slowly but at higher temperatures the reaction proceeds relatively rapidly. The reaction rate is further influenced by the state of hydration and the state of subdivision of the calcium sulphate. I have found it important to effect the mixture of the calcium sulphate with the aqueous solution of sodium bicarbonate under conditions such that no substantial separation of gaseous carbon dioxide occurs prior to the intended separation in the recovery vessel, particularly when it is desired to recover the gaseous carbon dioxide, or the bulk of the gaseous carbon dioxide, under superatmospheric pressure. This may be accomplished in several ways. For example, the reactants may be supplied to a combined reaction and recovery vessel through appropriate seals. I have found it particularly advantageous to effect the mixture at a temperature not exceeding about 20° C. and then to heat the mixture to a temperature upwards of about 20° C. prior to any substantial separation of carbon dioxide, the mixture being effected either in the reaction vessel or in a separate vessel.

When the reaction, or the primary reaction, is carried out under substantial superatmospheric pressure, I have found it advantageous, to secure a maximum conversion to sodium sulphate, to reduce the pressure following the primary reaction to effect a further separation of carbon dioxide. I have also found it advantageous, in this connection, to effect the initial mixture of the reactants under a pressure approximating atmospheric pressure and to increase the pressure on the mixture to the superatmospheric pressure under which the primary reaction is to be carried out prior to any substantial separation of carbon dioxide.

I have also found that maximum conversion to sodium sulphate is promoted by utilizing an excess of calcium sulphate. Improvement in conversion is obtained up to an excess of about 5% by weight with respect to the sodium bicarbonate supplied to the reaction; beyond this point no further advantage appears to be gained.

To effect a maximum recovery of sodium sulphate, the calcium carbonate separated from the sodium sulphate solution produced by the reaction must be washed to recover retained sodium sulphate. However, unless the resulting wash liquor, necessarily a relatively dilute solution of sodium sulphate, is kept separate from the initially separated solution of sodium sulphate, the concentration of the total sodium sulphate solution produced is diminished to an extent inconsistent with good economy. By cyclically utilizing the resulting wash liquor to produce the aqueous solution of sodium bicarbonate with which the calcium sulphate is initially mixed, separate recovery operations are made unnecessary. I have found it advantageous to utilize the resulting wash liquor as the sole substantial source of water in producing the aqueous solution of sodium bicarbonate with which the calcium sulphate is initially mixed and to utilize as wash water, in washing the calcium carbonate separated following separation of carbon dioxide, the maximum amount of water consistent with the production of a solution substantially saturated with respect to sodium sulphate following separation of liberated carbon dioxide. This advantageous amount of water to be used as wash water is readily determined as follows: The water supplied to the reaction as water associated with the sodium bicarbonate and as water associated with the calcium sulphate is determined by analysis and computation, the water formed in the reaction is determined by computation, and this total is subtracted from the total amount of water required to dissolve the total sodium sulphate produced to form a substantially saturated solution.

One form of apparatus adapted for carrying out a process embodying the several improvements of my invention is illustrated diagrammatically and conventionally in the accompanying drawing and the invention will be further described by reference to an operation embodying the several improvements of my invention as carried out in such apparatus. It will be understood of course that the improvements of my invention are not limited in application to operations conducted in any particular form of apparatus. For example, although the illustrated apparatus is adapted for continuous operation, the improvements of my invention are also useful in connection with batch operations.

The illustrated apparatus comprises a mixing vessel 1, a primary reaction vessel 2, a secondary reaction vessel 3, a conventional continuous rotary filter 4, a pair of traps 5 and 6 and a pair of storage vessels 7 and 8. The three vessels 1, 2 and 3 are each provided with a conventional stirring mechanism and the primary reaction vessel 2 is provided with a heating coil. Sodium bicarbonate and calcium sulphate are supplied to the mixing vessel 1 through hoppers 9 and 10, respectively, each connected with the mixing vessel through a conventional measuring seal. The aqueous medium for dissolving the sodium bicarbonate is supplied to the mixing vessel 1 through connection 11 by means of pump 12. Liquid flow from the mixing vessel 1 through the primary and secondary reaction vessels 2 and 3 to the continuous filter 4 is by means of gravity, the primary reaction vessel 2 being positioned below the mixing vessel 1 and the secondary reaction vessel 3 to permit the maintenance of a higher pressure in the primary reaction vessel 2 measured by the hydraulic head through the connecting legs 13 and 14. The mixing vessel 1 and the secondary reaction vessel 3 are operated under substantially atmospheric pressure and the primary reaction vessel 2 is operated under a substantial superatmospheric pressure. Gaseous carbon dioxide liberated in the primary reaction vessel 2 is discharged therefrom under the relatively high pressure maintained therein through connection 15 and gaseous carbon dioxide liberated in the secondary reaction vessel 3 is discharged therefrom under the relatively low pressure maintained therein through connection 16. The concentrated filtrate from the filter 4 is discharged through connection 17 and trap 6 to the storage vessel 8 and the dilute wash liquor from this filter is discharged through connection 18 and trap 5 to the storage vessel 7. Wash water is supplied to the filter 4 through connection 19 and compressed air for facilitating the discharge of the calcium carbonate cake over the scraping member 20 is supplied through connection 21. The reduced pressure necessary to maintain passage of the filtrate and the wash liquor through the filter is maintained by means of the exhauster 22. The valves controlling the filter operation are adjusted, approximately, so that concentrated filtrate is discharged to the trap 6 through that portion of the periphery of the filter moving between points A and B, and so that the wash liquor is discharged through the trap 5 through that portion of the filter moving between the points C and D, the separation of the calcium carbonate cake from the periphery of the filter taking place while it is moving between points E and F.

In one way of carrying out an operation embodying the improvements of my invention in apparatus such as that illustrated, for example: Crude sodium bicarbonate containing 14% (by weight) of water is supplied to the mixing vessel 1 at the rate of about 95.8 tons per day and natural anhydrite containing about 80% $CaSO_4$, ground to pass a 60-mesh screen, is supplied to the mixing vessel 1 at a rate of about 87.5 tons per day. Wash liquor containing about 12% $Na_2SO_4$ is supplied to the mixing vessel 1 at a rate of about 37,450 gallons per day. The temperature in the mixing vessel 1 is kept below 20° C. and the volume of the mixture maintained in this vessel is limited to the minimum necessary to insure thorough mixing and accurate proportioning to minimize the period during which the reactants are in contact prior to entry into the primary reaction vessel 2. A temperature of about 50°–60° C. is maintained in the primary reaction vessel 2. Gaseous carbon dioxide liberated therein is discharged under a superatmospheric pressure equivalent to the hydraulic head in the legs 13 and 14, 30 pounds per square inch (gauge), through connection 15, the discharge of the liberated carbon dioxide through this connection being regulated to maintain a liquid level somewhat below the top of the reaction vessel 2. A further liberation of gaseous carbon dioxide takes place under approximately atmospheric pressure in the secondary reaction vessel 3, this gaseous carbon dioxide being discharged through connection 16. Approximately 90% or more of the sodium bicarbonate supplied to the mixing vessel 1 is decomposed in the reaction vessel 2 and substantially all of the balance of this sodium bicarbonate is decomposed in the reaction vessel 3. A slurry aggregating about 178 tons of water, about 84 tons of dissolved sodium sulphate and about 58 tons of solids, principally calcium carbonate, per day flows from the secondary reaction vessel 3 to the continuous filter 4. Care is taken to maintain the slurry through the filter operation at a temperature above that at which sodium sulphate decahydrate would begin to precipitate, that is at a temperature above 33° C. for a slurry the liquid phase of which is a solution substantially saturated with respect to sodium sulphate for example. The solids in the slurry from the secondary reaction vessel 3, after separation from the sodium sulphate solution and after washing, are discharged over the scraping member 20, usually containing about 30% of water but less than 0.5% of sodium sulphate. The concentrated filtrate, an aqueous solution of sodium sulphate, containing about 32% $Na_2SO_4$, is discharged to the storage vessel 8 at a rate of about 37,450 gallons per day. The rate of supply of wash water is regulated to maintain the requisite supply of the aqueous medium, a wash liquor, to the mixing vessel 1; the wash liquor from the filter 4 being discharged to storage vessel 7 from which it is drawn to be supplied to the mixing vessel 1 as required.

Natural gypsum, natural anhydrite, any of the intermediate natural hydrates and artificially prepared calcium sulphates may be used in carrying out operations embodying the improvements of my invention.

The sodium sulphate content of the concentrated solutions produced in carrying out my invention can be recovered in any chosen manner. For example, the solution may be cooled to a temperature low enough to effect crystallization of sodium sulphate decahydrate, or the solution may be evaporated at temperatures above 33° C.

under vacuum to produce anhydrous sodium sulphate or the solution may be ammoniated to precipitate anhydrous sodium sulphate.

I claim:

1. In the manufacture of sodium sulphate by treatment of sodium bicarbonate with calcium sulphate, the improvement which comprises mixing the calcium sulphate with an aqueous solution of the sodium bicarbonate, separating liberated carbon dioxide from the mixture, separating calcium carbonate from the resulting solution of sodium sulphate, washing the separated calcium carbonate with water and cyclically utilizing the resulting wash liquor to produce the aqueous solution of the sodium bicarbonate with which the calcium sulphate is initially mixed.

2. In the manufacture of sodium sulphate by treatment of sodium bicarbonate with calcium sulphate, the improvement which comprises mixing the calcium sulphate with an aqueous solution of the sodium bicarbonate, separating liberated carbon dioxide from the mixture, separating calcium carbonate from the resulting solution of sodium sulphate, washing the separated calcium carbonate with water, and utilizing as the sole substantial source of water, in producing the aqueous solution of the sodium bicarbonate with which the calcium sulphate is initially mixed, the resulting wash liquor.

3. In the manufacture of sodium sulphate by treatment of sodium bicarbonate with calcium sulphate, the improvement which comprises mixing the calcium sulphate with an aqueous solution of the sodium bicarbonate, separating liberated carbon dioxide from the mixture, separating calcium carbonate from the resulting solution of sodium sulphate, washing the separated calcium carbonate with water and cyclically utilizing the resulting wash liquor to produce the aqueous solution of the sodium bicarbonate with which the calcium sulphate is initially mixed, the maximum amount of wash water consistent with the production of a solution substantially saturated with respect to sodium sulphate following separation of liberated carbon dioxide being used in washing the separated calcium carbonate.

4. In the manufacture of sodium sulphate by treatment of sodium bicarbonate with calcium sulphate, the improvement which comprises mixing the calcium sulphate with an aqueous solution of the sodium bicarbonate under a pressure approximating atmospheric pressure, delivering the mixture into a closed reaction vessel maintained under superatmospheric pressure, discharging carbon dioxide from said reaction vessel under superatmospheric pressure, the delivery of the mixture into the closed reaction vessel taking place simultaneously with the discharge of carbon dioxide from said vessel, and withdrawing sodium sulphate solution from said reaction vessel while reaction between sodium bicarbonate and calcium sulphate is taking place therein.

5. In the manufacture of sodium sulphate by treatment of sodium bicarbonate with calcium sulphate, the improvement which comprises mixing the calcium sulphate with an aqueous solution of the sodium bicarbonate under a pressure approximating atmospheric pressure, delivering the mixture into a closed reaction vessel maintained under superatmospheric pressure where reaction takes place between the sodium bicarbonate and the calcium sulphate to produce sodium sulphate, discharging carbon dioxide from said vessel under superatmospheric pressure, transferring the liquid reaction mixture from said closed reaction vessel to a second reaction vessel maintained under a lower pressure than the first reaction vessel, where further reaction takes place between sodium bicarbonate and calcium sulphate to produce sodium sulphate, discharging carbon dioxide from said second vessel, the delivery of the mixture into the closed reaction vessel and the transference of the liquid reaction mixture from the closed reaction vessel to the second reaction vessel taking place simultaneously with the discharge of carbon dioxide under pressure from said first reaction vessel, and discharging sodium sulphate solution from said second reaction vessel.

6. In the manufacture of sodium sulphate by treating sodium bicarbonate with calcium sulphate, the improvement which comprises mixing the calcium sulphate with an aqueous solution of the sodium bicarbonate under a pressure approximating atmospheric pressure, continuously delivering the mixture into a closed reaction vessel maintained under superatmospheric pressure where reaction takes place between the sodium bicarbonate and the calcium sulphate to produce sodium sulphate, continuously discharging carbon dioxide from said vessel under superatmospheric pressure, continuously transferring the liquid reaction mixture from said closed reaction vessel to a second reaction vessel maintained under a lower pressure than the first reaction vessel where further reaction takes place between sodium bicarbonate and calcium sulphate to produce sodium sulphate, continuously discharging carbon dioxide from said second reaction vessel, and withdrawing sodium sulphate solution from said second reaction vessel.

ROBERT B. MacMULLIN.